United States Patent [19]
Campbell

[11] 3,865,338
[45] Feb. 11, 1975

[54] FLOATING METER MOUNT

[75] Inventor: Max L. Campbell, Topeka, Kans.

[73] Assignee: Hydro-Flex Corporation, Inc., Topeka, Kans.

[22] Filed: Oct. 4, 1973

[21] Appl. No.: 403,537

[52] U.S. Cl. ................................ 248/295, 248/245
[51] Int. Cl. ............................................... A47f 5/00
[58] Field of Search............ 248/48.2, 125, 244–246, 248/295

[56] References Cited
UNITED STATES PATENTS

| 866,695 | 9/1907 | Taussig | 248/245 |
| 1,383,597 | 7/1921 | Bruce | 248/295 |

*Primary Examiner*—James C. Mitchell
*Attorney, Agent, or Firm*—Schmidt, Johnson, Hovey & Williams

[57] ABSTRACT

A floating meter mount limits the meter to solely rectilinear displacement in a generally vertical direction so as to preclude twisting or canting of the meter relative to its underground gas supply line during seasonal changes in soil conditions. Leakage of gas around the connection between the meter and the supply line is thereby positively precluded. The two-part mount has a track part that may be secured either to the foundation of a home or to an upright stake embedded in the ground, and a bracket part that is attached to the meter and reciprocates within the track part. A removable pin releasably holds the bracket in an intermediate position between its opposed limits prior to installation of the mount so as to assure that the meter has sufficient room for both upward and downward displacement once installed.

9 Claims, 5 Drawing Figures

PATENTED FEB 1 1 1975  3,865,338

FLOATING METER MOUNT

This invention relates to a special mount for controlling the response of an outdoor, domestic gas meter or the like to seasonal changes in soil conditions in the immediate vicinity of the meter. Typically, such meters are supported by an upright section of the rigid underground gas supply line that leads from a larger trunk line to the home in lieu of other means of permanent support. Inasmuch as the main length of this line is disposed in direct contact with the ground, it is necessarily subjected to considerable forces from the ground during seasonal temperature and moisture changes, responding with appreciable movement not limited to any single direction. Such movement is in turn transmitted to the meter which responds with canting or twisting of its own to damage the connection between the line and the meter, giving rise to significant gas leakage around such connection. Moreover, such deviant response can also damage the outlet connection of the meter with the short line leading from the meter into the home, thereby creating an additional source of gas leakage. This is, of course, a very unsatisfactory situation because of the inherent danger of explosion involved, not to mention the additional expense to the homeowner arising as a result of the escape of metered, but unused gas.

In the past, many meters were located within the basement of homes provided with such basements, but the more modern practice is to locate all gas meters outside of the house adjacent the foundation thereof. Accordingly, the meters are now more responsive to changing soil conditions than ever before, thus greatly increasing the instances where gas leakage can occur. Also of importance is the fact that such leakage is not limited to permanent homesites, but can occur in mobile home situations as well where the meters are similarly located outside the homes and derive their support from the ground, thereby subjecting these meters to the same type of periodic heaving forces experienced at permanent homesites.

Accordingly, one important object of the present invention is to provide a means by which a gas meter or the like can remain supported in a simple manner by the underground supply line thereto without the danger of gas leakage occurring because of damage to the connection between the supply line and the meter as a result of changing soil conditions.

Pursuant to the foregoing, another important object of this invention is to provide a special mount for the meter which limits shifting thereof to floating movement along a single, rectilinear path of travel rather than permitting the multidirectional, deviant twisting action heretofore commonplace with meters having underground supply lines.

An additional important object of the instant invention is the provision of a floating mount as aforesaid which has equal utility in both permanent homesites where the mount is secured to the foundation of the home and mobile homesites where the mount is carried by a stake embedded in the ground.

A further important object of the invention is to provide a mount which accomplishes the aforementioned unidirectional restraint of the meter without involving complicated mechanisms or structures.

As will be appreciated from the preceding material, as well as from that hereinafter set forth, the floating mount of the present invention has particular utility for gas meters in order to eliminate the gas leakage problem earlier discussed. However, it is to be understood that the principles of the present invention are not limited solely to gas meters but may be applied to any articles requiring the special control afforded by the floating mount hereinafter described.

Figure 4:
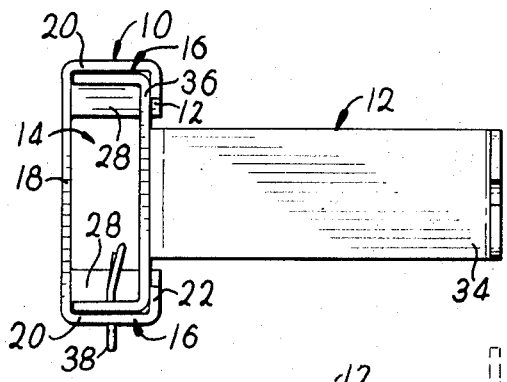
FIG. 4 is a top plan view of the mount.
Figure 3:
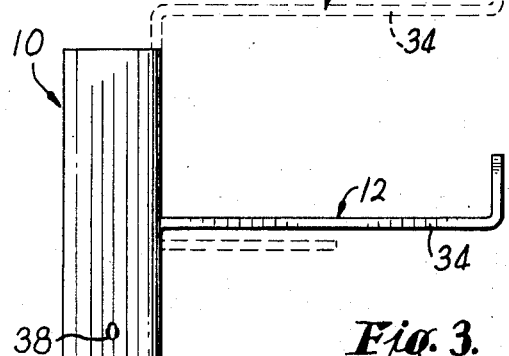
FIG. 3 is a side elevational view thereof indicating by broken lines a position to which the shiftable bracket of the mount may move in response to upward displacement of the meter.
Figure 1:
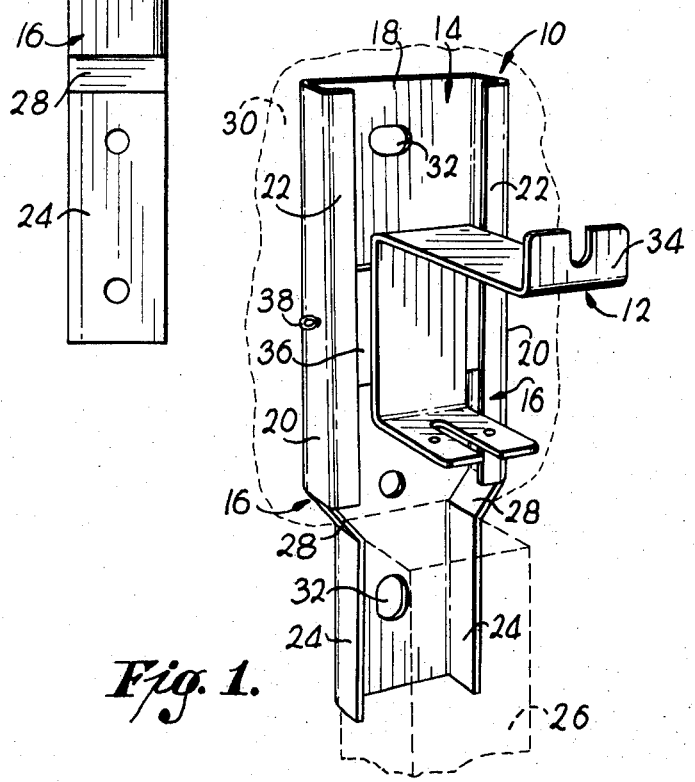
FIG. 1 is a front perspective view of a floating mount constructed in accordance with the principles of the present invention, the broken lines indicating a stake and a vertical surface to which the mount may be alternatively attached.
Figure 2:
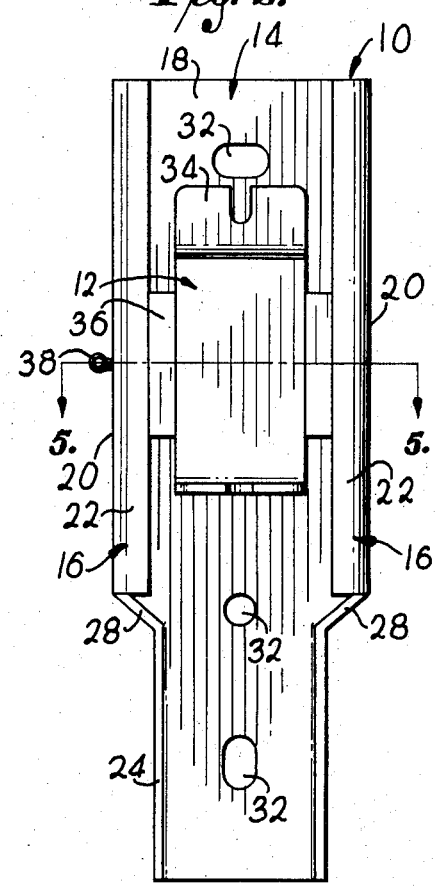
FIG. 2 is a slightly enlarged front elevational view of the mount.
Figure 5:
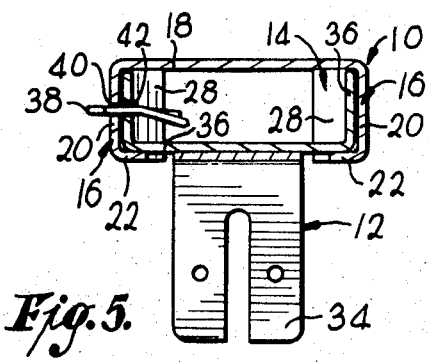
FIG. 5 is a horizontal cross-sectional view of the mount taken along line 5—5 of FIG. 2.

The mount of the present invention has two major parts, i.e., an elongated, generally transversely U-shaped guide member 10 and an element 12 that is reciprocable longitudinally of member 10 within the elongated, rectilinear track 14 of the latter. Member 10 is open at its opposite ends and has a pair of spaced-apart legs 16 extending between such ends. A flat bight 18 interconnects legs 16 to impart the generally U-shaped configuration to member 10, and the normally upper sections 20 of legs 16 have inturned flanges 22 that cooperate with bight 18 to define the track 14. The normally lower sections 24 of legs 16 are devoid of flanges and are spaced a shorter distance apart than upper sections 20 to define an area for receiving a suitable stable object such as a stake 26 driven into the ground (FIG. 1). Intermediate inclined leg sections 28 between upper and lower sections 20 and 24 respectively, define the lower limit of track 14. As an alternative to the stake 26, the member 10 may be fastened directly to a larger stable object such as the vertical face 30 of a home foundation, and for this reason the exterior surface of bight 18 is flattened so as to lie smoothly against face 30. A number of mounting holes 32 may be provided through bight 18 to receive suitable fasteners (not shown) for securing member 10 against face 30 or to stake 26.

The element 12 is in the nature of a generally C-shaped bracket 34 welded or otherwise permanently affixed to a U-shaped component 36 that is configured complementally to the member 10 for sliding movement within track 14 under flanges 22. When component 36 is disposed within track 14, it is thus well confined by sections 20, bight 18, and flanges 22 so that component 36 can move only rectilinearly, along track 14, without deviation from side-to-side.

The specific configuration of bracket 34 is subject to change depending upon the particular article to be secured thereto. In the embodiment illustrated, the bracket 34 is designed to accommodate a gas meter of conventional configuration, but it is to be understood that such is for purposes of illustration only and is not intended to be limiting to the principles of the present invention.

The element 12 is pictured throughout the Figures in an intermediate position between the upper and lower limits of track 14. This is the position in which element 12 will normally appear prior to installation of the mount and when no shifting of the meter or other article has occurred after the meter and mount have been installed. By virtue of this arrangement, the element 12 is started in a location that provides adequate room for displacement both upwardly and downwardly should such available space in opposite directions become necessary. In order to assure that the mount is, in fact, installed with element 12 in such intermediate position, a cotter pin 38 is provided that may be inserted into apertures 40 and 42 in one leg 20 and the component 36 respectively when such apertures 40 and 42 are in registration with one another. Such registration of the apertures 40 and 42 can only occur when the element 12 is in its intermediate position and, therefore, the cotter pin 38 can be used to releasably retain element 12 in its proper position until installation has been completed.

In use, the mount may be attached either to the face 30 of a house foundation or to the stake 26 embedded solidly in the ground beside the building structure such as a mobile home. In either case, the mount is oriented with the longitudinal axis of member 10 disposed in an upright condition so that reciprocation of element 12 will be limited to a substantially vertical direction. If foundation face 30 is utilized, the member 10 is simply placed against the same and the fasteners (not shown) inserted into the holes 32 until the exterior surface of member 10 is drawn tightly against face 30. If stake 26 is employed, the lower open end of member 10 is simply forced onto stake 26 with sections 24 embracing the latter, whereupon the fasteners may be applied. Then, the bracket 34 is attached to the meter and the pin 38 removed, completing the installation.

As aforementioned, the element 12 is limited solely to rectilinear movement because of the control provided by track 14. Accordingly, the meter fastened to the bracket 34 can move only vertically in spite of the forces that may be applied thereagainst in various directions from the ground via the supply line. Consequently, the meter and the supply line do not twist or turn relative to one another during changing soil conditions, hence precluding damage to the connection between the meter and the line with the resulting gas escape. Although the tendency of the ground is to cant or heave the meter in any number of different directions, the track 14 effectively restrains the meter against such multidirectional movement and allows it to shift only vertically so as not to disturb the connection between the meter and its supply line.

It is clear that if the meter were rigidly mounted or affixed to an immobile object, the connection between the same and its supply line would be quite subject to breakage as the supply line rose and fell in response to changing soil conditions. By allowing the meter to float with the supply line, but only in a rectilinear, vertical path of travel, there can be no relative movement between the meter and the line, and there can be no twisting or canting of the connection. Therefore, the connection can remain fully intact for periods of long duration without requiring maintenance or repair, and the heretofore ever-present danger of gas escape is completely avoided.

Having thus described the invention, what is claimed as new and desired to be secured by Letters Patent is:

1. A floating mount for a ground-supported article requiring freedom from canting and angular heaving such as caused by seasonal variations in soil conditions, said mount comprising:
    a normally upright guide member adapted for attachment to a stable object adjacent said article and having an elongated, rectilinear track normally extending in a substantially vertical direction;
    a follower element adapted for attachment to said article and reciprocable along said track only longitudinally thereof; and
    means for releasably retaining said element in a preselected position along said track intermediate the opposed ends thereof only until attachment of the element to the article,
    said element normally being freely reciprocable along a single rectilinear path of travel along said track in either an up or down vertical direction from said preselected position after said article is attached to said element and said retaining means are released whereby to permit vertical floating movement of said article relative to said member in response to changing soil conditions, but preclude deviant canting or heaving of the article during such vertical movement.

2. A floating mount as claimed in claim 1, wherein said releasable retaining means comprises a pin, said element and said member having apertures for receiving said pin transversely of said track when the apertures are aligned with one another.

3. A floating mount as claimed in claim 1, wherein said member is generally transversely U-shaped having a pair of spaced-apart legs and a bight interconnecting the same, at least a section of each leg having an inturned flange for cooperating with the opposite flanged leg to define said track.

4. A floating mount as claimed in claim 3, wherein said element includes a mounting bracket for said article and a complementally transversely U-shaped component received between said legs and under said flanges thereof.

5. A floating mount as claimed in claim 3, wherein said legs have second sections spaced closer together than said sections having said inturned flanges for receiving an object in embracing relationship when the member is attached thereto.

6. A floating mount as claimed in claim 5, wherein said bight has a planar outer surface for lying flatly against an object when the member is attached thereto.

7. A floating mount as claimed in claim 6, wherein said second sections are disposed at one end of said first-mentioned sections and extend substantially parallel thereto, there being a pair of inclined, third sections interconnecting said first-mentioned and said second sections and defining one limit of said track.

8. A floating mount as claimed in claim 7, wherein said element includes a mounting bracket for said article and a complementally transversely U-shaped component received between said legs and under said flanges thereof.

9. A floating mount as claimed in claim 8, wherein one of said first-mentioned sections and said component are provided with a pair of apertures that may be brought into registration with one another, said apertures having a removable pin extending therethrough for releasably holding said bracket in a preselected position along said track until the bracket is attached to said article.

* * * * *